US008215211B2

(12) United States Patent
Akiyama et al.

(10) Patent No.: US 8,215,211 B2
(45) Date of Patent: Jul. 10, 2012

(54) METHOD AND APPARATUS FOR MACHNING V GROOVES

(75) Inventors: Takanobu Akiyama, Numazu (JP); Satoshi Kato, Shizuoka-Ken (JP); Hiroyuki Kakishima, Shizuoka-Ken (JP); Sumihisa Kondou, Yamaga (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 427 days.

(21) Appl. No.: 12/503,970

(22) Filed: Jul. 16, 2009

(65) Prior Publication Data

US 2010/0011920 A1 Jan. 21, 2010

(30) Foreign Application Priority Data

Jul. 17, 2008 (JP) ................................. 2008-186041

(51) Int. Cl.
*B23B 5/36* (2006.01)
*B23B 1/00* (2006.01)
(52) U.S. Cl. .......................................... 82/1.11; 82/118
(58) Field of Classification Search .................... 82/1.11, 82/117, 118, 101, 150, 151, 149, 142, 148; 29/606; 336/200; 33/503, 501; 700/160, 700/195
See application file for complete search history.

(56) References Cited

U.S. PATENT DOCUMENTS

| 1,417,521 | A | 5/1922 | Haumann |
| 1,949,512 | A | 3/1934 | Norton |
| 2,028,293 | A | 1/1936 | OBrien et al. |
| 2,194,729 | A | * | 3/1940 | Wills ............................. 82/137 |
| 2,222,206 | A | 11/1940 | Stone et al. |

(Continued)

FOREIGN PATENT DOCUMENTS

CN 2541118 3/2003

(Continued)

OTHER PUBLICATIONS

English Language Translation of JP 2004-223836 published Aug. 12, 2004.

(Continued)

*Primary Examiner* — Will Fridie, Jr.
(74) *Attorney, Agent, or Firm* — DLA Piper LLP (US)

(57) ABSTRACT

There is provided a V-groove machining method and apparatus which, by measuring the depth of a V groove cut by a cutting tool and correcting the cutting depth of the cutting tool based on the measurement data, enables high precision machining of four-sided pyramids having vertices of a uniform height. The V-groove machining method includes the steps of: feeding a cutting tool relative to a workpiece in a first direction to create a first V groove, extending in the first direction, in the surface of the workpiece, and repeating this machining operation to create first V grooves at a predetermined pitch; moving the cutting tool along one of the first V grooves and scanning the first V groove with a distance sensor, disposed near the cutting tool, to measure the distance to the bottom of the first V groove, thereby detecting undulation of the bottom of the first V groove along the first direction; and feeding the cutting tool relative to the workpiece in a second direction orthogonal to the first direction to create a second V groove in the surface of the workpiece, and repeating this machining operation while correcting the position of the cutting tool in the machining position for each second V groove based on the results of detection of the undulation, thereby creating second V grooves at a predetermined pitch.

10 Claims, 6 Drawing Sheets

U.S. PATENT DOCUMENTS

| | | | | |
|---|---|---|---|---|
| 2,235,578 A * | 3/1941 | Ford | | 409/289 |
| 2,354,411 A | 7/1944 | Thompson | | |
| 2,378,261 A | 6/1945 | Turney | | |
| 2,502,268 A * | 3/1950 | Moss | | 82/11.1 |
| 2,526,487 A * | 10/1950 | Kurzweil et al. | | 82/133 |
| 2,534,333 A | 12/1950 | Wyrick | | |
| 2,559,138 A | 7/1951 | Waterson | | |
| 2,658,418 A * | 11/1953 | Hoelscher | | 82/158 |
| 2,677,310 A * | 5/1954 | Campbell | | 409/99 |
| 2,682,698 A | 7/1954 | Berthiez | | |
| 2,760,397 A | 8/1956 | Arpon | | |
| 3,017,697 A | 1/1962 | Wlodek | | |
| 3,125,931 A | 3/1964 | Stanaback | | |
| 3,159,065 A | 12/1964 | Diener | | |
| 3,348,057 A * | 10/1967 | Burroughs | | 356/141.3 |
| 3,449,985 A | 6/1969 | Eaves et | | |
| 3,703,112 A | 11/1972 | Selby | | |
| 3,841,805 A | 10/1974 | Zalis | | |
| 3,985,049 A | 10/1976 | Streckfus | | |
| 3,996,454 A | 12/1976 | Froyd | | |
| 4,225,273 A | 9/1980 | Womack | | |
| 4,266,276 A | 5/1981 | Hayashi et al. | | |
| 4,461,121 A | 7/1984 | Motzer et al. | | |
| 4,617,503 A | 10/1986 | Davis | | |
| 4,617,764 A | 10/1986 | Reibakh | | |
| 4,761,891 A * | 8/1988 | Sugimura | | 33/503 |
| 4,766,788 A | 8/1988 | Yashiki et al. | | |
| 4,833,764 A | 5/1989 | Muller | | |
| 4,840,095 A | 6/1989 | Nussbaumer et al. | | |
| 4,876,931 A | 10/1989 | Bertini | | |
| 5,050,468 A * | 9/1991 | Nydigger | | 82/1.11 |
| 5,152,202 A | 10/1992 | Strauss | | |
| 5,197,228 A | 3/1993 | Sharkey et al. | | |
| 5,222,283 A | 6/1993 | Laschet | | |
| 5,289,622 A | 3/1994 | Minagawa | | |
| 5,946,991 A | 9/1999 | Hoopman | | |
| 5,964,016 A | 10/1999 | Ito et al. | | |
| 6,040,653 A | 3/2000 | O'Neill | | |
| 6,075,221 A | 6/2000 | Minhas | | |
| 6,457,391 B1 | 10/2002 | Yamazaki et al. | | |
| 6,578,254 B2 * | 6/2003 | Adams et al. | | 29/606 |
| 6,865,789 B2 | 3/2005 | Katoh et al. | | |
| 6,868,304 B2 | 3/2005 | Uehara et al. | | |
| 6,945,147 B2 | 9/2005 | Sakashita | | |
| 6,952,627 B2 | 10/2005 | Olczak et al. | | |
| 7,089,836 B2 | 8/2006 | Kato et al. | | |
| 7,240,412 B2 | 7/2007 | Sasazawa et al. | | |
| 7,266,871 B2 | 9/2007 | Takeuchi et al. | | |
| 7,441,484 B1 | 10/2008 | Larsen | | |
| 2002/0008899 A1 | 1/2002 | Tanaka et al. | | |
| 2002/0082742 A1 | 6/2002 | Kadono | | |
| 2004/0003690 A1 | 1/2004 | Katoh et al. | | |
| 2004/0045419 A1 | 3/2004 | Bryan | | |
| 2004/0050222 A1 | 3/2004 | Sakashita | | |
| 2004/0187654 A1 | 9/2004 | Kato et al. | | |
| 2007/0042160 A1 | 2/2007 | Nakajima | | |
| 2007/0251360 A1 | 11/2007 | Akiyama | | |
| 2007/0295175 A1 | 12/2007 | Akiyama | | |

FOREIGN PATENT DOCUMENTS

| | | |
|---|---|---|
| CN | 1491765 | 4/2004 |
| CN | 1736659 | 2/2006 |
| DE | 2935829 | 8/1980 |
| EP | 0403842 | 12/1990 |
| JP | 59-024943 A | 2/1984 |
| JP | 01-177924 A | 7/1989 |
| JP | 04-283003 | 10/1992 |
| JP | 11033801 | 2/1999 |
| JP | 2001-328002 | 11/2001 |
| JP | 2001-336596 | 12/2001 |
| JP | 2002-079401 | 3/2002 |
| JP | 2002-160133 | 6/2002 |
| JP | 2002-346803 | 12/2002 |
| JP | 2003-94239 | 4/2003 |
| JP | 2004-223836 | 8/2004 |
| JP | 2004-344916 | 12/2004 |
| JP | 2004-345062 | 12/2004 |
| JP | 2004-358624 | 12/2004 |
| JP | 2005-022058 | 1/2005 |
| JP | 2005-537944 | 12/2005 |
| JP | 2006-130066 | 5/2006 |
| JP | 2006-135560 | 5/2006 |
| JP | 2006-156388 | 6/2006 |
| JP | 2006-165144 | 6/2006 |
| JP | 2006-166404 | 6/2006 |
| JP | 2007-320022 | 12/2007 |
| KR | 0251794 | 4/2000 |
| SU | 1227375 | 4/1986 |
| SU | 1741981 | 6/1992 |
| SU | 1815012 | 5/1993 |
| TW | M278500 | 10/2005 |
| WO | WO 2004-024421 | 3/2004 |

OTHER PUBLICATIONS

English Language Translation of DE 2935829 published Aug. 1, 1980.
Office Action issued in corresponding Japanese Application No. 2006-123626 on Sep. 10, 2010.
English translation of Office Action issued in corresponding Japanese Application No. 2006-123626 on Sep. 10, 2010.
English Language Abstract of JP 59-024943A, published Feb. 8, 1984.
English Language Abstract of JP 01-177924A, published Jul. 14, 1989.
U.S. Appl. No. 11/762,524 from Jul. 7, 2010 to Nov. 22, 2010.
U.S. Appl. No. 11/762,511 from Jul. 7, 2010 to Nov. 22, 2010.
U.S. Appl. No. 12/062,931 from Jul. 7, 2010 to Nov. 22, 2010.
U.S. Appl. No. 11/739,884 from Oct. 29, 2010 to Nov. 22, 2010.
English Abstract of JP 11033801 published Feb. 9, 1999.
English Translation of JP 11033801 published Feb. 9, 1999.
Office Action issued in Korean Appl 10-2009-65152 on Mar. 30, 2011.
English Translation of Office Action issued in Korean Appl 10-2009-65152 on Mar. 30, 2011.
English Abstract of JP 2002-346803 published Dec. 4, 2002.
English Translation of JP 2002-346803 published Dec. 4, 2002.
English Abstract of JP 2007-320022 published Dec. 13, 2007.
English Translation of JP 2007-320022 published Dec. 13, 2007.
Office Action issued in JP 2006-166404 on Mar. 29, 2011.
English Language Translation of Office Action issued in JP 2006-166404 on Mar. 29, 2011.
Englished Abstract of JP 2001-336596 published Dec. 7, 2011.
English Translation of JP 2001-336596 published Dec. 7, 2011.
U.S. Appl. No. 12/062,931 from Mar. 22, 2011 to Jun. 10, 2011.
U.S. Appl. No. 11/739,884 from Mar. 22, 2011 to Jun. 10, 2011.
English Language Abstract of JP 2004-345062 published Dec. 1, 2004.
English Language machine translation of JP 2004-345062 published by Dec. 1, 2004.
English Language Abstract of JP 2003 94239 published Apr. 3, 2003.
English Language machine translation of JP 2003 94239 published Apr. 3, 2003.
Office Action Issued in Counterpart Korean Application No. 10-2007-0040936, Mailed Mar. 27, 2008.
English language translation of Korean Office Action issued in Application No. 10-2007-0040936, mailed Mar. 27, 2008.
English language abstract of JP 2002-160133, published Jun. 4, 2002.
English language abstract of JP 2005-022058, published Jan. 27, 2005.
Machine English language translation of JP 2002-160133, published Jun. 4, 2002.
Machine English language translation of JP 2005-022058, published Jan. 27, 2005.
Korean Offiice Action issued in Application No. 10-2007-0040936 mailed Dec. 12, 2008.
Translation of Korean Offiice Action issued in Application No. 10-2007-0040936 mailed Dec. 12, 2008.
Korean Offiice Action issued in Application No. 10-2007-0057853 mailed Dec. 12, 2008.

Translation of Korean Offiice Action issued in Application No. 10-2007-0057853 mailed Dec. 12, 2008.
English Language Abstract of JP 2001-328002 published Nov. 27, 2001.
English Language Abstract of JP 2002-079401 published Mar. 19, 2002.
Korean Offiice Action issued in Application No. 10-2007-0058393 mailed Dec. 12, 2008.
Translation of Korean Offiice Action issued in Application No. 10-2007-0058393 mailed Dec. 12, 2008.
English language machine translation of JP 2001-328002 published Nov. 27, 2001.
English language machine translation of JP 2002-079401 published Mar. 19, 2002.
Chinese Office Action issued in Application No. 200710138844.2 mailed Feb. 27, 2009.
English Language Translation of Chinese Office Action issued in Application No. 200710138844.2 mailed Feb. 27, 2009.
English Language Abstract of CN 1736659 published Feb. 22, 2006.
Chinese Office Action issued in Application No. 200710138845.7 mailed Mar. 6, 2009.
English Translation of Chinese Office Action issued in Application No. 200710138845.7 mailed Mar. 6, 2009.
English Language Translation of Office Action issued in TW Appl 096121380 dated Aug. 26, 2009.
Office Action issued in TW Appl 096121380 dated Aug. 26, 2009.
English Language Translation of Office Action issued in TW Appl 096121381 dated Aug. 26, 2009.
Office Action issued in TW Appl 096121381 dated Aug. 26, 2009.
Office Action issued in Korean Application 10-2007-0057853 dated Oct. 19, 2009.
English Translation of Korean Office Action issued in KR Appl. 10-2007-0057853 dated Oct. 19, 2009.
English Language Abstract of KR 0251794 issued Apr. 15, 2000.
English Language Abstract of JP 2004-344916 published Dec. 9, 2004.
Machine translation of JP 2004-344916 published Dec. 9, 2004.
English Language Translation of Chinese Office Action in CN Appl 2008-10090587.4 on Sep. 4, 2009.
Chinese Office Action in CN Appl 2008-10090587.4 on Sep. 4, 2009.
English Language Abstract of JP 2004-223836 published Aug. 12, 2004.
English Translation of Office Action issued in Korean Appl 10-2008-0031455 on Dec. 18, 2009.
Office Action issued in Korean Appl 10-2008-0031455 on Dec. 18, 2009.
English Abstract of JP Publication 04-283003 published Oct. 8, 1992.
English Abstract of JP Publication 2005-537944 published Dec. 15, 2005.
English machine translation of JP Publication 2005-537944 published Dec. 15, 2005.
U.S. Appl. No. 12/062,931 dated Jul. 6, 2010.
U.S. Appl. No. 11/739,884 dated Jul. 6, 2010.
U.S. Appl. No. 11/762,524 dated Jul. 6, 2010.
U.S. Appl. No. 11/762,511 dated Jul. 6, 2010.
English language abstract of JP 2004-358624, published Dec. 24, 2004.
Machine English language translation of JP 2004-358624, published Dec. 24, 2004.
English language abstract of JP 2006-130066, published May 25, 2006.
Machine English language translation of JP 2006-130066, published May 25, 2006.
English language abstract of JP 2006-135560, published May 25, 2006.
Machine English language translation of JP 2006-135560, published May 25, 2006.
English language abstract of JP 2006-156388, published Jun. 15, 2006.
Machine English language translation of JP 2006-156388, published Jun. 15, 2006.
English language abstract of JP 2006-165144, published Jun. 22, 2006.
Machine English language translation of JP 2006-165144, published Jun. 22, 2006.
English language abstract of JP 2006-166404, published Jun. 22, 2006.
Machine English language translation of JP 2006-166404, published Jun. 22, 2006.
Taiwanese Office Action issued in TW 97111866 on Aug. 16, 2011.
English Language Translation of Taiwanese Office Action issued in TW 97111866 on Aug. 16, 2011.
U.S. Appl. No. 13/051,870 electronically captured on Nov. 16, 2011.
U.S. Appl. No. 12/062,931 electronically captured on Nov. 16, 2011.
U.S. Appl. No. 11/739,884 electronically captured on Nov. 16, 2011.
U.S. Appl. No. 11/762,524 electronically captured on Nov. 16, 2011.
U.S. Appl. No. 12/062,931 from Nov. 23, 2010 to Mar. 21, 2011.
U.S. Appl. No. 11/739,884 from Nov. 23, 2010 to Mar. 21, 2011.
U.S. Appl. No. 11/762,524 from Nov. 23, 2010 to Mar. 21, 2011.
U.S. Appl. No. 11/762,511 from Nov. 23, 2010 to Mar. 21, 2011.
U.S. Appl. No. 13/051,870 electronically captured from Dec. 20, 2011 to Mar. 20, 2012 on Mar. 20, 2012.
U.S. Appl. No. 12/062,931 between Feb. 21, 2012 and May 21, 2012 on May 21, 2012.
U.S. Appl. No. 13/051,870 between Feb. 21, 2012 and May 21, 2012 on May 21, 2012.

* cited by examiner

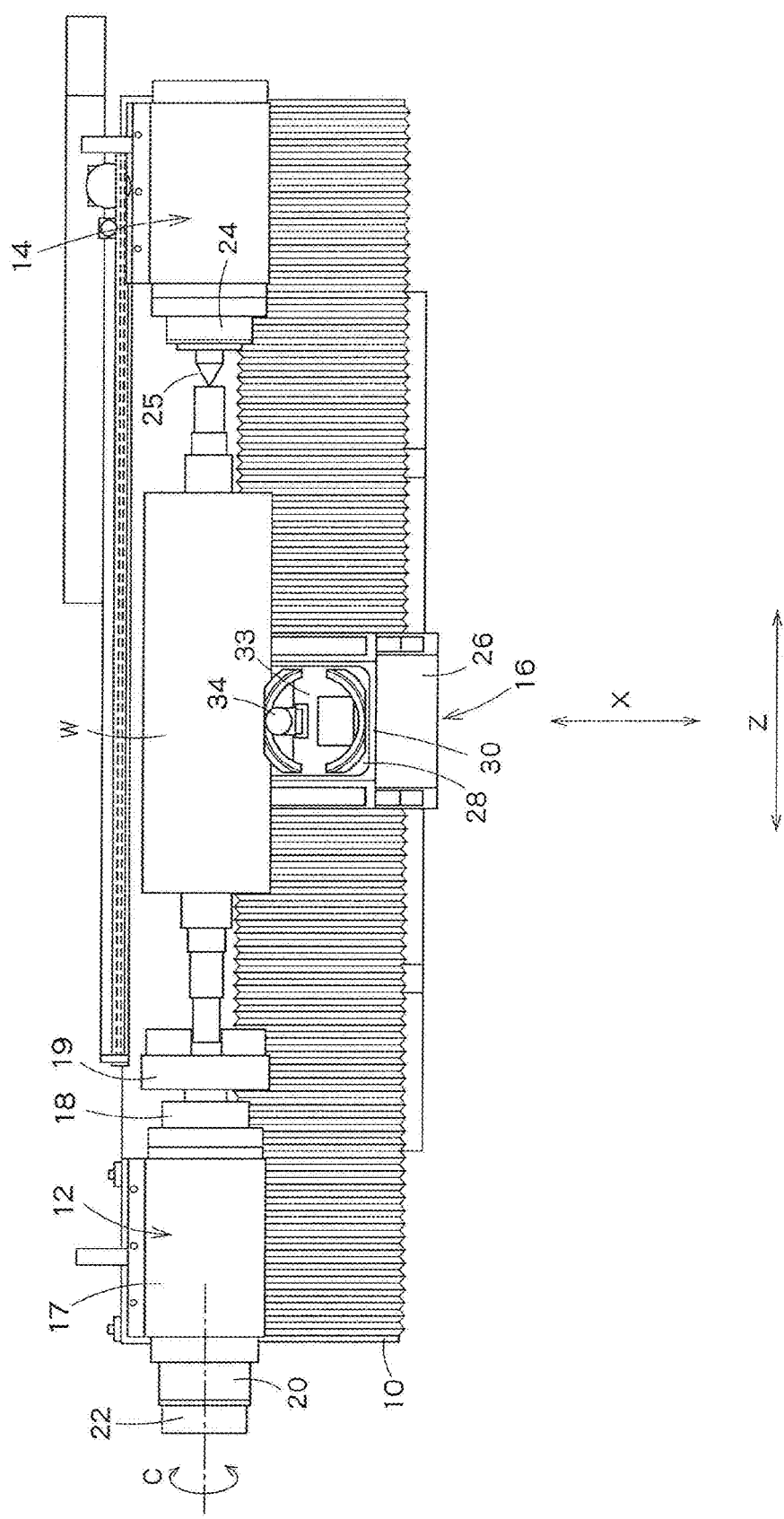
F I G. 2

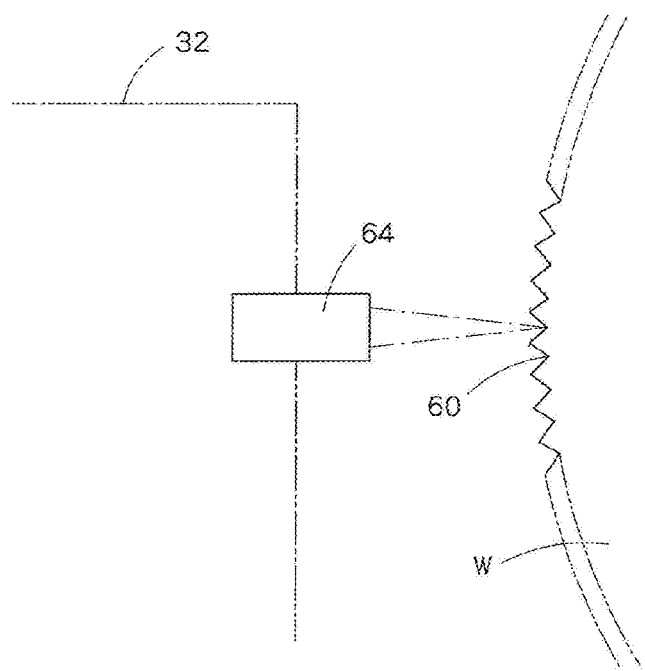
F I G. 7
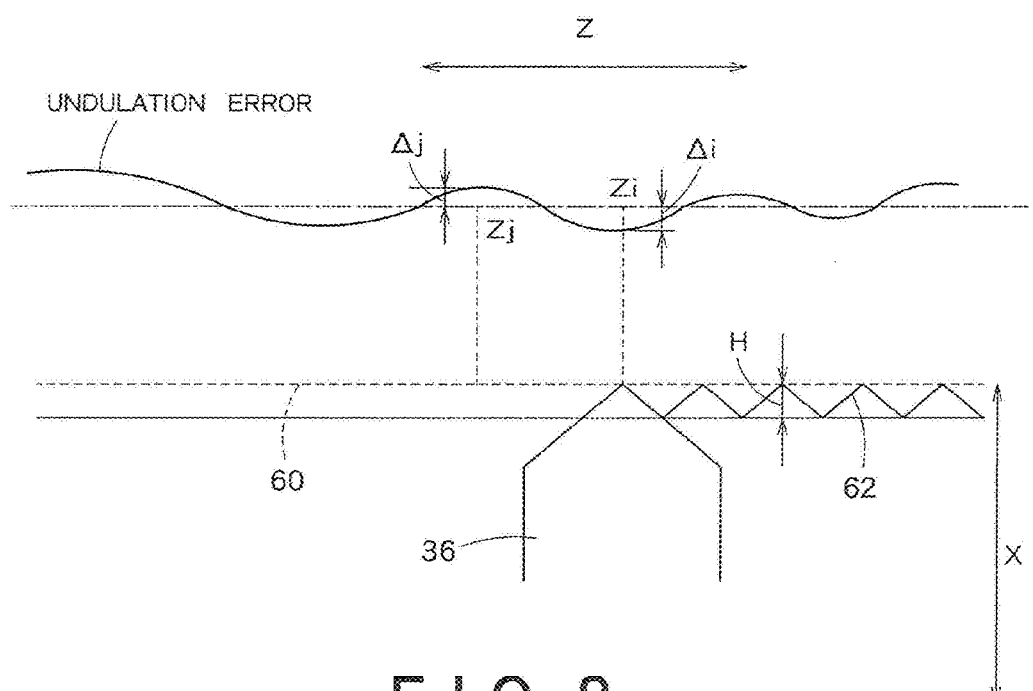
F I G. 8

METHOD AND APPARATUS FOR MACHNING V GROOVES

CROSS REFERENCE TO RELATED APPLICATIONS

This application claims the benefit of Japanese Patent Application No. 2008-186041, filed on Jul. 17, 2008, the entire disclosure of which is incorporated herein by reference.

BACKGROUND OF THE INVENTION

1. Field of the Invention

The present invention relates to a method and apparatus for machining V grooves, which is useful for machining a mold for molding e.g. a lenticular lens sheet or a cross lenticular lens sheet.

2. Background Art

The recent advancement of machine control technology has realized ultraprecision machining with a lathe, and it has become possible to machine even with a lathe a mold for molding an optical lens. For example, the applicant has proposed a vertical lathe capable of machining a mold for molding a Fresnel lens (Japanese Patent Laid-Open Publication No. 2004-358624). The vertical lathe can machine with high precision V-shaped lens grooves of a mold for molding of a Fresnel lens.

Molding a lenticular lens sheet, a cross lenticular lens sheet, a prism sheet, etc., which are for use in a backlight of a liquid crystal panel, by extrusion molding is being studied these days.

The applicant has proposed precision roll turning lathes for machining a roll for use in extrusion molding of such a lens sheet (Japanese Patent Applications Nos. 2006-130066, 2006-135560, 2006-156388, 2006-165144 and 2006-166404).

FIG. 5 shows the surface of a mold for molding a cross lenticular lens sheet. As shown in FIG. 5, a pattern of minute four-sided pyramids densely arranged in a matrix is formed in the surface of the mold. Such a pyramid pattern can be formed by creating longitudinal and lateral V grooves at a predetermined pitch in the surface of a workpiece such that the both grooves intersect.

The conventional V-groove machining for forming four-sided pyramids highly depends on the machine accuracy, involving the problem that the machine accuracy directly reflects the shape accuracy of the resulting four-sided pyramids.

Thus, poor mechanical accuracy will give rise to variation in the depths of V grooves as cut by a cutting tool, resulting in the formation of four-sided pyramids having vertices of non-uniform heights. The machined mold will be inappropriate for use in molding of a high-precision cross lenticular lens sheet.

SUMMARY OF THE INVENTION

It is therefore an object of the present invention to solve the above problems in the prior art and provide a V-groove machining method and apparatus which, by measuring the depth of a V groove cut by a cutting tool and correcting the cutting depth of the cutting tool based on the measurement data, enables high precision machining of four-sided pyramids having vertices of a uniform height.

In order to achieve the object, the present invention provides a V-groove machining method for machining a three-dimensional pattern of four-sided pyramids, arranged in a matrix in the surface of a workpiece, by machining first V grooves and second V grooves, orthogonally intersecting each other, in the surface of the workpiece by using a machining apparatus having two control axes for controlling the position of a cutting tool in orthogonal directions, said method comprising the steps of: feeding the cutting tool relative to the workpiece in a first direction to create a first V groove, extending in the first direction, in the surface of the workpiece, and repeating this machining operation to create the first V grooves at a predetermined pitch; moving the cutting tool along one of the first V grooves and scanning the first V groove with a distance sensor, disposed near the cutting tool, to measure the distance to the bottom of the first V groove, thereby detecting undulation of the bottom of the first V groove along the first direction; and feeding the cutting tool relative to the workpiece in a second direction orthogonal to the first direction to create a second V groove in the surface of the workpiece, and repeating this machining operation while correcting the position of the cutting tool in the machining position for each second V groove based on the results of detection of the undulation, thereby creating the second V grooves at a predetermined pitch.

The present invention also provides a V-groove machining method for machining a three-dimensional pattern in the surface of a workpiece by machining V grooves in one direction in the surface of the workpiece by using a machining apparatus having at least one control axis for controlling the position of a cutting tool, said method comprising the steps of: scanning the surface of the workpiece in one direction with a distance sensor, disposed near the cutting tool, to measure the distance to the surface of the workpiece, thereby detecting undulation of the surface of the workpiece along said one direction; and feeding the cutting tool relative to the workpiece in said one direction to create a V groove in the surface of the workpiece, and repeating this machining operation while correcting the position of the cutting tool in the machining position for each V groove based on the results of detection of the undulation, thereby creating the V grooves at a predetermined pitch.

The present invention also provides a V-groove machining apparatus comprising: a bed; a headstock, mounted on the bed, having a main spindle for rotating a roll as a workpiece while holding one end of the roll by means of a chuck and having an indexing axis (C axis) for performing circumferential indexing of the roll; a tail stock, mounted on the bed and disposed opposite the headstock, for rotatably supporting the other end of the roll; a carriage including a saddle mounted on the bed movably in the longitudinal direction (Z-axis direction) of the roll, and a table mounted on the saddle movably in a direction (X-axis direction) perpendicular to the longitudinal direction of the roll; a tool post, mounted on the table, having a cutting tool attached thereto; a distance sensor, provided in the tool post, for measuring the distance to the surface of the roll; means for scanning with the distance sensor a first V groove machined in the longitudinal direction of the roll or a second V groove machined in the circumferential direction of the roll to measure the distance to the bottom of the groove, thereby detecting undulation of the bottom of the first or second V groove; and means for correcting, based on the results of detection of the undulation, the position on the X axis of the cutting tool in the machining position for each of V grooves when machining the V grooves which orthogonally intersect the measured V groove.

The present invention, by measuring the depth of a V groove cut by a cutting tool and correcting the cutting depth of the cutting tool based on the measurement data, enables high precision machining of four-sided pyramids having vertices of a uniform height without depending on the machine accuracy.

BRIEF DESCRIPTION OF THE DRAWINGS

FIG. 2 is a plan view of the roll turning lathe;

FIG. 7 is a diagram illustrating measurement of undulation of the bottom of a longitudinal groove, carried out by the v-groove machining method of the present invention; and FIG. 8 is a diagram illustrating machining of lateral grooves and correction of the position of a cutting tool, carried out by the v-groove machining method of the present invention.

DETAILED DESCRIPTION OF THE PREFERRED EMBODIMENT

A V-groove machining method and apparatus according to an embodiment of the present invention will now be described in detail with reference to the drawings.

Figure 1:
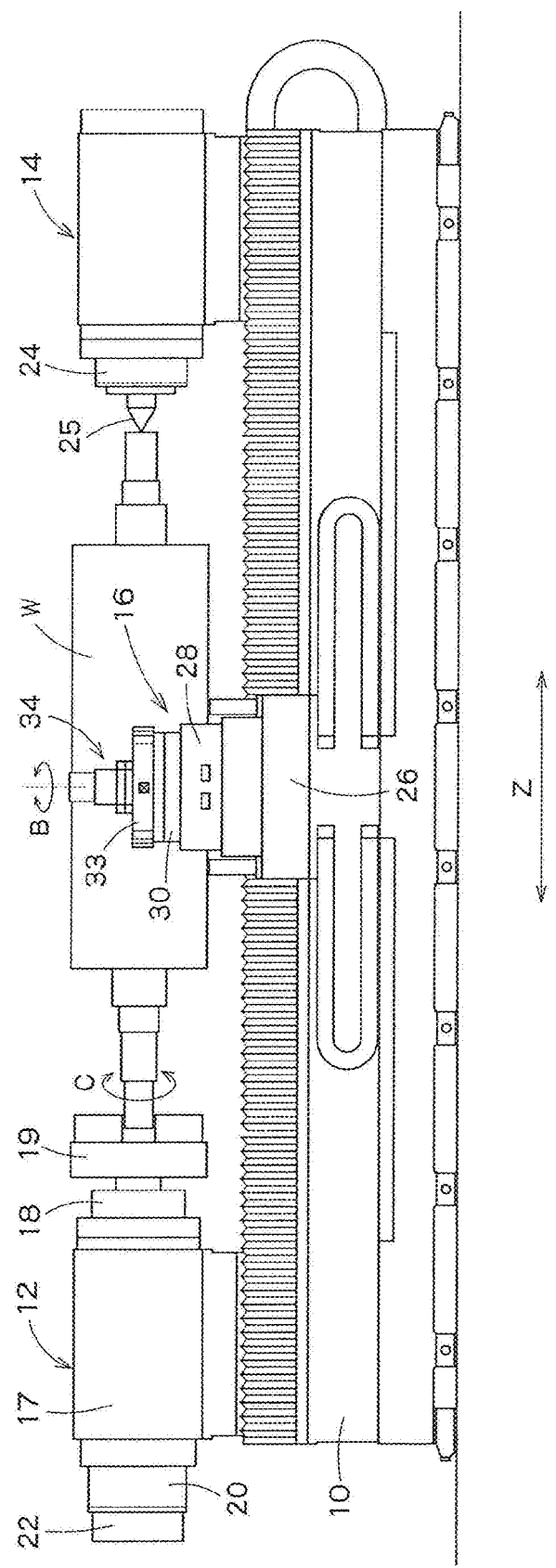
FIG. 1 is a front view of a roll turning lathe for carrying out a V-groove machining method according to the present invention.

FIGS. 1 and 2 show a roll turning lathe for carrying out a V-groove machining method according to an embodiment of the present invention.

In FIGS. 1 and 2, reference numeral 10 denotes a bed. On the bed 10 are mounted a headstock 12, a tail stock 14 and a carriage 16. A roll W as a workpiece is rotatably supported by the headstock 12 and the tail stock 14.

The headstock 12 is disposed on one longitudinal end of the bed 10. The headstock 12 includes a body 17, a main spindle 18, a chuck 19 secured to the front end of the main spindle 18, and a servo motor 20 for driving the main spindle 18. The main spindle 18 is supported by a not-shown hydrostatic oil bearing provided within the body 17. The chuck 19 holds a spindle of the roll W and transmits the rotation of the main spindle 18 to the roll W.

In the headstock 12, the servo motor 20 for driving the main spindle 18 is a built-in servo motor that directly drives the main spindle 18. The revolutions of the main spindle 18 are detected with an encoder 22. The detection signal of the encoder 22 is fed back to perform position control and speed control of the main spindle 18. The headstock 12 thus can function as an indexing axis (C axis) to perform circumferential indexing of the roll W and can also function to continuously rotate the main spindle 18 at a constant rotating speed (up to several hundred revolutions per minute).

Further referring to FIGS. 1 and 2, the tail stock 14 is disposed on the bed 10 and opposite to the headstock 12. A not-shown guide surface is provided on the upper surface of the bed 10 so that the tail stock 14 can be moved along the guide surface. The tail stock 14 has a main spindle 24 instead of a conventional common tail spindle, and rotatably supports the spindle of the roll W by means of a chuck 25 mounted to the main spindle 24. Such a tail stock 14 basically has the same construction as the headstock 12 except for having no servo motor.

A description will now be given of the carriage 16.

The carriage 16 includes a saddle 26 mounted on the bed 10 movably in the axial direction of the roll W. On the saddle 26 is mounted a table 28 movably in a direction perpendicular to the axial direction of the roll W.

In the precision roll turning lathe of this embodiment, the axis along which the saddle 26 is fed in the axial direction of the roll W is termed Z axis, and the axis along which the table 28 is fed on the saddle 26 in a direction perpendicular to the axial direction of the roll W is termed X axis. In addition to the X axis and the Z axis, the headstock 12 has the C axis and a tool swivel 30, mounted on the table 28, has a B axis. The precision roll turning lathe thus is a four-axis control machine tool.

Figure 3:
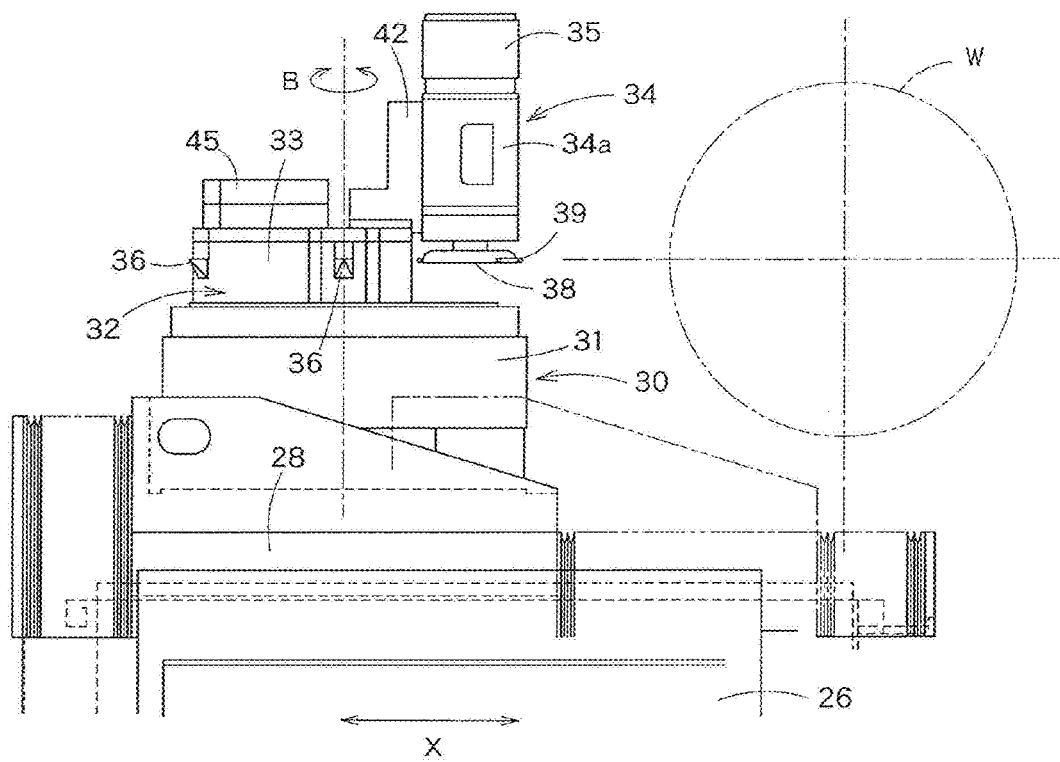
FIG. 3 is a side view of the tool post of the roll turning lathe.

FIG. 3 shows a tool swivel 30 and a tool post 32 mounted on the tool swivel 30. In this embodiment the tool post 32 is comprised of a tool post body 33 and a tool post attachment 34. The tool post attachment 34 can be attached to and detached from the tool post body 33.

The tool post body 33 has cutting tools 36 arranged circumferentially at predetermined intervals. In this embodiment three diamond tools 36 are provided in the tool post body 33, and each tool 36 can be indexed by swiveling the tool post 32 90 degrees. The number of the diamond tools 36 is, of course, not limited to three. For example, it is possible to provide four diamond tools 36 and index each tool by swiveling the tool post 32 60 degrees. The height position of the diamond tools 36 (center height), mounted in the tool post body 33, can be measured on the machine and adjusted manually.

The tool post attachment 34 is comprised of a fly cutter spindle device. The fly cutter spindle device includes a body 34a, a servo motor 35 and a cutter holder 38 having a fly cutter 39 (cutting tool for fly cutting) attached thereto. A not-shown cutter spindle is supported by an air bearing in the interior of the body 34a. The cutter spindle is driven by the servo motor 35 and rotates at a high speed.

In FIG. 3, the X-axis moving direction of the diamond tool 36 is a direction parallel to the radial direction of the roll W, i.e. the direction in which the cutting edge of the diamond tool 36 moves toward the axis of the roll W. The Z-axis moving direction of the diamond tool 36 is the longitudinal direction of the roll W.

Figure 4:
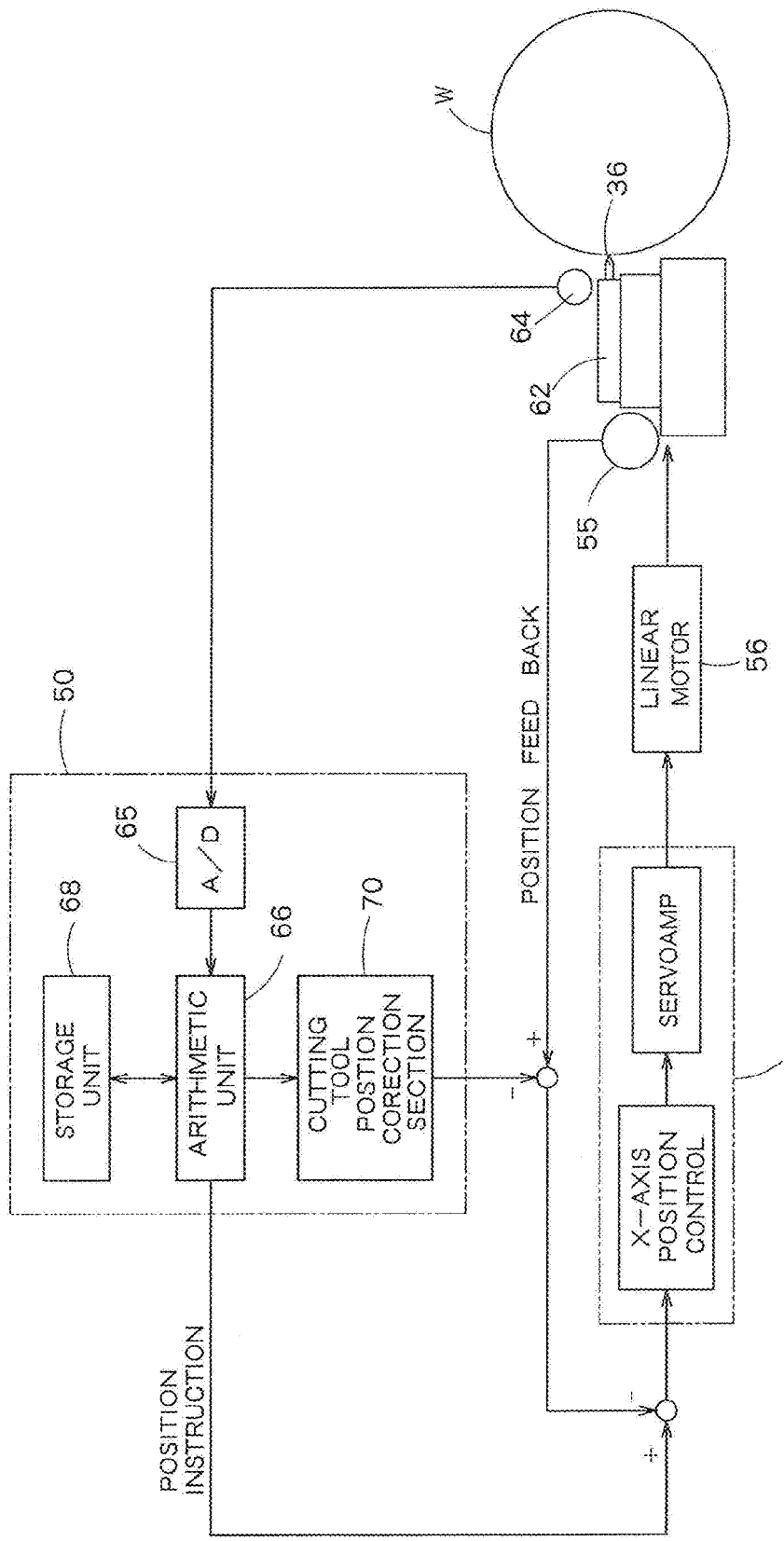
FIG. 4 is a control block diagram showing the X-axis control of the roll turning lathe.

Referring now to FIG. 4, reference numeral 50 denotes an NC apparatus. The NC apparatus 50 numerically controls the X axis, Z axis, B axis and C axis.

With respect to the X axis, a position control loop is formed by an X-axis servo mechanism 54 and an X-axis position detector 55. Based on comparison of a position command from the NC apparatus 50 with a position feedback from the X-axis position detector 55, a linear motor 56 is controlled so that the cutting edge of the diamond tool 36 coincides with the command position. of the diamond tool 36 on the X axis. Further, the NC apparatus 50 is connected to not-shown. B-axis servo mechanism and C-axis servo mechanism and to a not-shown Z-axis servo mechanism including a linear motor which moves the saddle 26, in order to perform indexing of the roll W and the tool post 32 and positioning of the diamond tool 36 on the Z axis.

Figure 5:
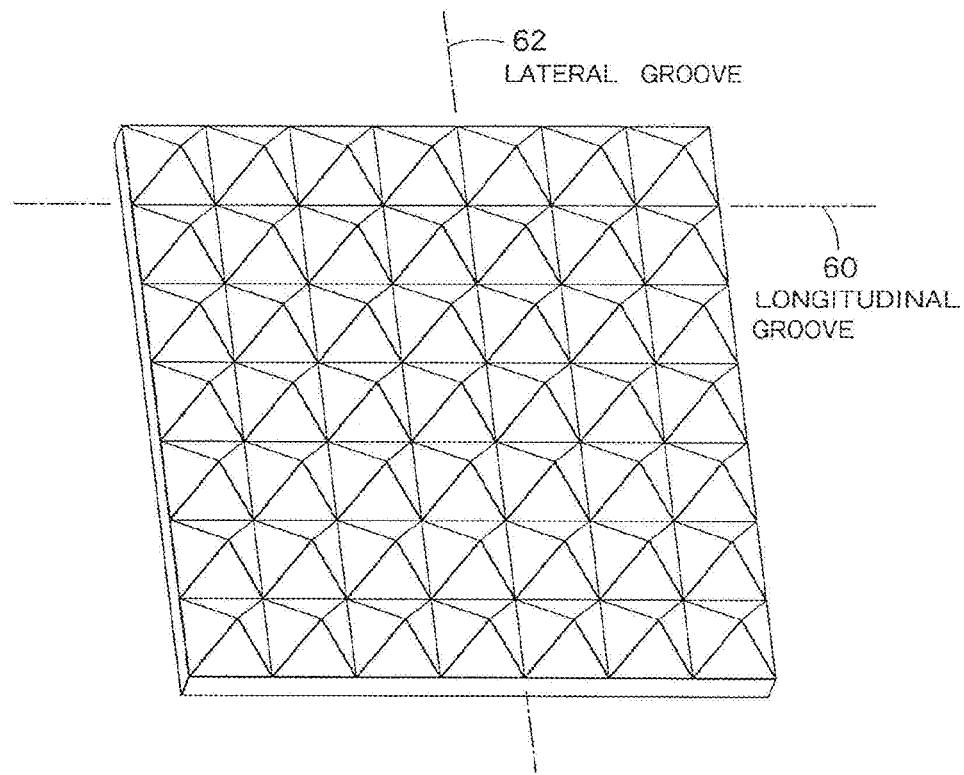
FIG. 5 is a diagram illustrating a three-dimensional pattern of four-sided pyramids as machined by the V-groove machining method of the present invention.

FIG. 5 is a diagram showing a three-dimensional pattern to be machined in the surface of the roll W. As shown in FIG. 5, the three-dimensional pattern consists of four-sided pyramids arranged in a matrix.

Such a pattern of four-sided pyramids can be formed basically by machining longitudinal grooves 60 (axial V grooves) and lateral grooves 62 (circumferential V grooves) in combination. In particular, the longitudinal grooves 60 are first machined sequentially at a predetermined pitch, and then the lateral grooves 62, intersecting the longitudinal grooves 60, are machined sequentially at a predetermined pitch, thereby forming a pattern of four-sided pyramids arranged in a matrix in the surface of the roll W.

The NC apparatus 50 shown in FIG. 4 has the following special functions in order to machine a pattern of four-sided pyramids with precision on the roll W.

In FIG. 4, reference numeral 64 denotes a distance sensor for measuring the distance to the surface of the roll W. The distance sensor 64 is disposed in the tool post 32.

The distance sensor 64 can scan a longitudinal groove 60 machined in the axial direction of the roll W or a lateral groove 62 machined in the circumferential direction and measure the distance to the bottom of the groove. The output of the distance sensor 64 is loaded via an A/D converter 65 into an arithmetic unit 66 of the NC apparatus 52, and the arithmetic unit 66 calculates undulation of the bottom of the longitudinal groove 60 or the lateral groove 62. Data on the calculated undulation is stored in a storage unit 68.

If longitudinal grooves 60 have been machined first, the distance sensor 64 scans one of the longitudinal grooves 60 over the entire length of the roll and, based on the measurement data, undulation of the bottom of the longitudinal groove 60 is detected. When machining lateral grooves 62, a cutting tool position correction section 70 corrects a position feedback from the X-axis position detector 55 in the machining position of the diamond tool 36 for each lateral groove 62 by utilizing the undulation detection data for the longitudinal groove 60. In this manner, the position on the X axis of the cutting edge of the diamond tool 36 is corrected. The position correction will be described in more detail later.

If lateral grooves 62 have been machined first, the distance sensor 64 scans one of the lateral grooves 62 over the entire circumference of the roll and, based on the measurement data, undulation of the bottom of the lateral groove 62 is detected. When machining longitudinal grooves 60, the position on the X axis of the cutting edge of the diamond tool 36 is corrected in the above-described manner.

A description will now be made of machining of V grooves by means of the precision roll turning lathe thus constructed.

First, longitudinal grooves 62 are machined in the entire surface of the roll W in the following manner: In FIG. 3, the tool post body 33 swivels to index the fly cutter spindle device 34 with the B axis. A circumferential position on the roll W, at which machining is to be started, is precisely indexed with the C axis.

Figure 6:
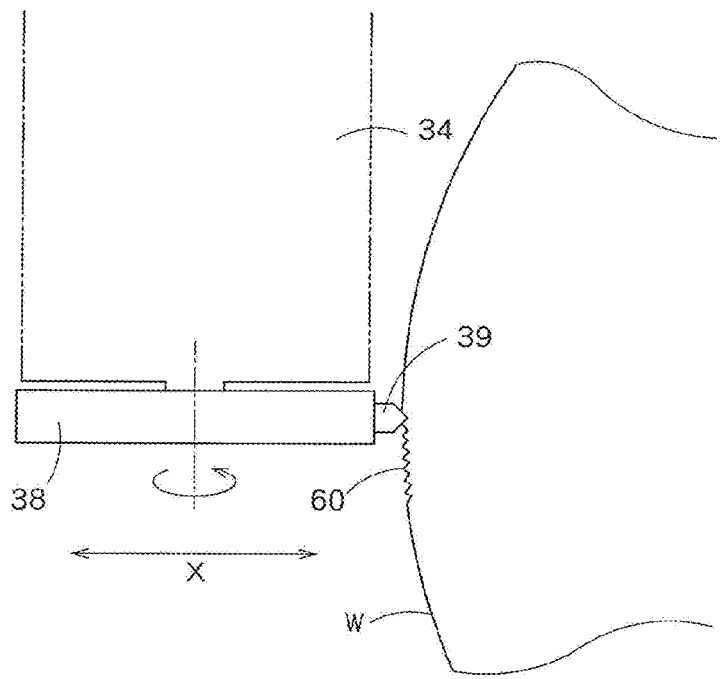
FIG. 6 is a diagram illustrating machining of longitudinal grooves by the v-groove machining method of the present invention.

As shown in FIG. 6, a V-shaped diamond tool having a tip angle of 90° is used as the fly cutter 39 of the fly cutter spindle device 34. When the fly cutter spindle device 34 is actuated, the disk-shaped cutter holder 38 rotates at a high speed and the fly cutter 39 is cut into the roll W in the X-axis direction. While maintaining the high-speed rotation of the cutter holder 38, the carriage 16 is fed in the Z-axis direction, thereby machining a longitudinal groove 60 over the entire length of the roll W. The fly cutter 39 intermittently cuts the roll W, producing the V-shaped longitudinal groove 60. The high-speed revolution of the fly cutter 39 of the fly cutter spindle device 34 can attain an ideal cutting speed (about 300 m/min).

Longitudinal grooves 60 are thus machined sequentially while indexing with the C axis a circumferential machining start positions on the roll W upon the start of machining of each longitudinal groove 60. It is noted that machining of longitudinal grooves 60 is not necessarily carried out using the fly cutter 39. It is, of course, possible to machine such grooves in the usual manner using the diamond tool 36.

After thus machining the longitudinal grooves 60 in the entire surface of the roll W, undulation of the bottom of one of the longitudinal grooves 60 is measured by scanning the groove with the distance sensor 64.

As shown in FIG. 7, the tool swivel 32 swivels to index the distance sensor 64. Though overdrawn in FIG. 7, the longitudinal grooves 60 actually are machined at a pitch of 20 to 100 μm. A sensor such as a laser displacement sensor, having a spot size which is sufficiently smaller than the pitch of the grooves 60, is used as the distance sensor 64. A laser spot can reach the bottom of a longitudinal groove 60.

The carriage 16 is fed in the Z-axis direction to scan a longitudinal groove 60 with the distance sensor 64, whereby undulation of the bottom of the longitudinal groove 60 can be measured as shown by the curve in FIG. 8. Such undulation of the bottom of a groove is produced by the non-straightness of the Z-axis direction linear movement of the carriage 16, related to the machine accuracy.

Machining of lateral grooves 62 will now be described. First, one of the diamond tools 36 of the tool post 33 is indexed with the B axis. The roll W is continuously rotated by means of the servo motor 20 of the head stock 12. While rotating the roll W, the table 28 is fed in the X-axis direction to cause the diamond tool 36 to cut into the roll, W, thereby creating a groove having the same V shape as that of the cutting edge of the diamond tool. For machining of the subsequent lateral grooves 62, the same operation is repeated while feeding the diamond tool 36 a distance, corresponding to the pitch of the grooves, in the Z-axis direction at the start of each groove 62, thereby machining all the grooves 62.

In this embodiment, when machining each lateral groove 62, the position of the diamond tool 36 is corrected by using the above-described data on the undulation of the bottom of a longitudinal groove 60 as follows:

Assume that an error in the undulation of the bottom of a longitudinal groove 60 in the machining position Zi for a lateral groove 62 is Δi as shown in FIG. 8.

If no correction is made upon machining of the lateral groove 62 in the machining position Zi, the lateral groove 62 will be machined too deeply (when the error Δi is minus) or too shallowly (when the error Δi is plus) by the undulation error Δi.

In contrast, the lateral groove 62 can be machined to a constant depth by correcting the feedback detection position xi on the X axis of the diamond tool 36 in the following manner when machining the lateral groove 62 in the machining position zi.

As shown in FIG. 8, the feedback detection position x on the X axis of the diamond tool 36 is corrected by subtracting an undulation error Δ therefrom. Based on the correction, a lateral groove 62 is machined as follows: Assuming that an undulation error in the machining position zi is Δi (plus), the lateral groove 62 is machined until a command value X and the value "x-Δi" coincide. That is, the lateral groove 62 is machined more deeply than the command value X by Δi.

Similarly, assuming that an undulation error in the machining position zj is Δj (minus), the lateral groove 62 is machined until a command value X and the value "x-Δj" coincide. That is, the lateral groove 62 is machined more shallowly than the command value X by Δj.

If all the lateral grooves 62 are machined in this manner, the depths of the grooves 62 will be equal. When viewed in terms of the heights H of the vertices of the four-sided pyramids produced by the intersection of longitudinal grooves 60 and lateral grooves 62, the heights of the vertices will be equal without excess or deficient machining.

A pattern of four-sided pyramids having a uniform shape can be machined with high precision in the surface of the roll W in the above-described manner. The machined roll can be used as a mold for molding a cross lenticular lens sheet.

High-precision machining of a pattern of four-sided pyramids having a uniform shape in the surface of the roll W is possible also by first machining lateral grooves 62, measuring undulation of the bottom of a lateral groove 62 and performing a similar correction when machining longitudinal grooves 60.

In this embodiment the pitch of longitudinal grooves 60 (lateral grooves 62) is 20 to 100 µm, and the spot of the laser displacement sensor reaches the bottom of a groove. However, there may be cases where the pitch is so small that the spot cannot reach the bottom of a groove. In such a case, a sensor rather having a large spot size, e.g. a capacitance sensor, may be used. Undulation of the bottom of a groove may be determined by averaging the depths of those grooves which fall within the spot size of the sensor.

Though in the above-described embodiment a pattern of four-sided pyramids is created by machining longitudinal grooves 60 and lateral grooves 62 orthogonally intersecting each other, the present invention is also applicable to machining of V-shaped longitudinal grooves (or lateral grooves) in one direction in the surface of a roll. The machined roll can be used as a mold for molding of a lenticular lens sheet or a Fresnel lens sheet.

In that case, undulation of the surface of a roll may be measured first. When machining V grooves at a predetermined pitch, the above-described correction of the position of the diamond tool 36 may be performed in the machining position for each V groove. This manner of machining can provide a mold capable of molding a high-precision optical lens sheet.

While the case of machining a roll as a workpiece by means of the roll turning lathe has been described, the present invention is also applicable to machining of V grooves in a matrix in the surface of a flat workpiece to create a pattern of four-sided pyramids. In that case, a planning machine capable of machining V grooves in a matrix can be used as a machining apparatus. A pattern of four-sided pyramids can be formed by first machining longitudinal grooves (lateral grooves) at a predetermined pitch in one direction, measuring undulation of the bottom of a longitudinal groove (lateral groove), and machining lateral grooves (longitudinal grooves) at a predetermined pitch while correcting the position of a diamond tool based on the results of the undulation measurement.

What is claimed is:

1. A V-groove machining method for machining a three-dimensional pattern of four-sided pyramids, arranged in a matrix in the surface of a workpiece, by machining first V grooves and second V grooves, orthogonally intersecting each other, in the surface of the workpiece by using a machining apparatus having two control axes for controlling the position of a cutting tool in orthogonal directions, said method comprising the steps of:
   feeding the cutting tool relative to the workpiece in a first direction to create a first V groove, extending in the first direction, in the surface of the workpiece, and repeating this machining operation to create the first V grooves at a predetermined pitch;
   moving the cutting tool along one of the first V grooves and scanning the first V groove with a distance sensor, disposed near the cutting tool, to measure the distance to the bottom of the first V groove, thereby detecting undulation of the bottom of the first V groove along the first direction; and
   feeding the cutting tool relative to the workpiece in a second direction orthogonal to the first direction to create a second V groove in the surface of the workpiece, and repeating this machining operation while correcting the position of the cutting tool in the machining position for each second V groove based on the results of detection of the undulation, thereby creating the second V grooves at a predetermined pitch.

2. The V-groove machining method according to claim 1, wherein the workpiece is a roll, the first V grooves are V grooves formed in the axial direction of the roll and the second V grooves are V grooves formed in the circumferential direction of the roll.

3. The V-groove machining method according to claim 1, wherein the workpiece has a flat shape.

4. The V-groove machining method according to claim 1, wherein the first V grooves and the second V grooves are machined at a pitch of 20 to 100 µm.

5. The V-groove machining method according to claim 1, wherein the three-dimensional pattern machined in the surface of the workpiece is for use in molding of a cross lenticular lens sheet.

6. A V-groove machining method for machining a three-dimensional pattern in the surface of a workpiece by machining V grooves in one direction in the surface of the workpiece by using a machining apparatus having at least one control axis for controlling the position of a cutting tool, said method comprising the steps of:
   scanning the surface of the workpiece in one direction with a distance sensor, disposed near the cutting tool, to measure the distance to the surface of the workpiece, thereby detecting undulation of the surface of the workpiece along said one direction; and
   feeding the cutting tool relative to the workpiece in to said one direction to create a V groove in the surface of the workpiece, and repeating this machining operation while correcting the position of the cutting tool in the machining position for each V groove based on the results of detection of the undulation, thereby creating the V grooves at a predetermined pitch.

7. The V-groove machining method according to claim 6, wherein the three-dimensional pattern machined in the surface of the workpiece is for use in molding of an optical lens sheet.

8. A V-groove machining apparatus comprising:
   a bed;
   a headstock, mounted on the bed, having a main spindle for rotating a roll as a workpiece white holding one end of the roll by means of a chuck and having an indexing axis (C axis) for performing circumferential indexing of the roll;
   a tail stock, mounted on the bed and disposed opposite the headstock, for rotatably supporting the other end of the roll;
   a carriage including a saddle mounted on the bed movably in the longitudinal direction (Z-axis direction) of the roll, and a table mounted on the saddle movably in a direction (X-axis direction) perpendicular to the longitudinal direction of the roll;
   a tool post, mounted on the table, having a cutting tool attached thereto; a distance sensor, provided in the tool post, for measuring the distance to the surface of the roll;
   means for scanning with the distance sensor a first V groove machined in the longitudinal direction of the roll or a second V groove machined in the circumferential direction of the roll to measure the distance to the bottom of the groove, thereby detecting undulation of the bottom of the first or second V groove; and means for correcting, based on the results of detection of the undulation, the position on the X axis of the cutting tool in the machining position for each of V grooves when machining the V grooves which orthogonally intersect the measured V groove.

9. The V-groove machining apparatus according to claim 8, wherein the distance sensor is a laser displacement sensor having such a spot size that the spot reaches the bottom of a single V groove.

10. The V-groove machining apparatus according to claim 8, wherein the distance sensor is a capacitance sensor having such a spot size that the. spot ranges over a plurality of adjacent V grooves.

* * * * *